United States Patent [19]

Tanaka et al.

[11] Patent Number: 4,754,477
[45] Date of Patent: Jun. 28, 1988

[54] KEY TELEPHONE SYSTEM

[75] Inventors: Kouji Tanaka; Yoshihiro Ikeda, both of Kanagawa; Ryuzo Sugiura, Tokyo; Junzo Kikuchi; Hikaru Sano, both of Kanagawa, all of Japan

[73] Assignee: Tamura Electric Works, Ltd., Tokyo, Japan

[21] Appl. No.: 828,284

[22] Filed: Feb. 11, 1986

[30] Foreign Application Priority Data

Feb. 18, 1985 [JP] Japan .............................. 60-20518[U]
Feb. 18, 1985 [JP] Japan .............................. 60-20519[U]

[51] Int. Cl.$^4$ ........................ H04Q 5/18; H03K 5/08
[52] U.S. Cl. .................................... 379/165; 307/359; 375/7; 328/150
[58] Field of Search ............... 379/157, 158, 159, 160, 379/161, 162, 163, 164, 165, 166, 156, 93; 307/360, 359, 361; 375/7, 36, 76; 328/150

[56] References Cited

U.S. PATENT DOCUMENTS

| | | | |
|---|---|---|---|
| 3,666,970 | 5/1972 | Abbott et al. | 307/237 |
| 4,086,534 | 4/1978 | Olson | 325/15 |
| 4,224,534 | 9/1980 | Gordon | 307/261 |
| 4,494,241 | 1/1985 | Mayoux | 375/76 |
| 4,550,306 | 10/1985 | Kimura | 340/310 R |
| 4,574,206 | 3/1986 | Todokoro et al. | 307/359 |

*Primary Examiner*—Stewart J. Levy
*Assistant Examiner*—Laurence G. Fess
*Attorney, Agent, or Firm*—Blakely, Sokoloff, Taylor & Zafman

[57] ABSTRACT

There is disclosed a data transmitting and receiving circuit extremely advantageous when applied to a key telephone system. The data transmitting circuit comprises a voltage dividing circuit for dividing a power supply voltage to apply the divided voltage to one end of a primary winding of a transformer, and a driver circuit comprising a pair of transistors connected in series between the power supply and a common potential terminal, the node of the transistors being connected to the other end of the primary winding of the transformer. When data signal is transmitted, the data transmitting circuit is operative to complementarily turn and off the pair of transistors in accordance with the data signal. In contrast, when data is not transmitted, the data transmitting circuit is operative to cut off both the transistors. Thus, the data transmitting circuit can eliminate the possibility that a DC voltage on which a data signal to be transmitted is superimposed undesirably changes. Further, the data receiving circuit comprises a voltage divider common to the above-mentioned voltage dividing circuit, a comparator having a comparison input connected to the other end of the secondary winding of the transformer, and a reference voltage supply circuit for selecting either of two reference voltages depending upon a binary output level of the comparator to deliver the selected one to the reference input of the comparator. Thus, the data receiving circuit can provide a stable and steady receiving condition when a data signal superimposed on a DC voltage is received to change the data signal into a binary received signal.

16 Claims, 11 Drawing Sheets

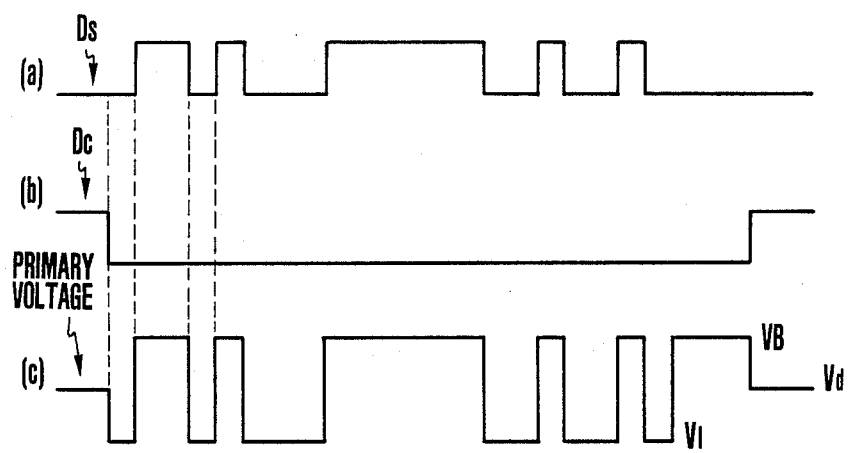
F I G. 5A
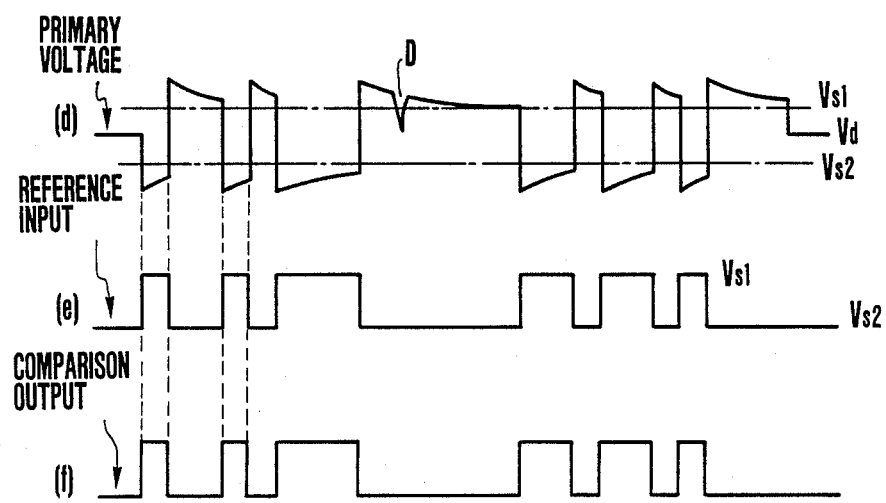
F I G. 5B

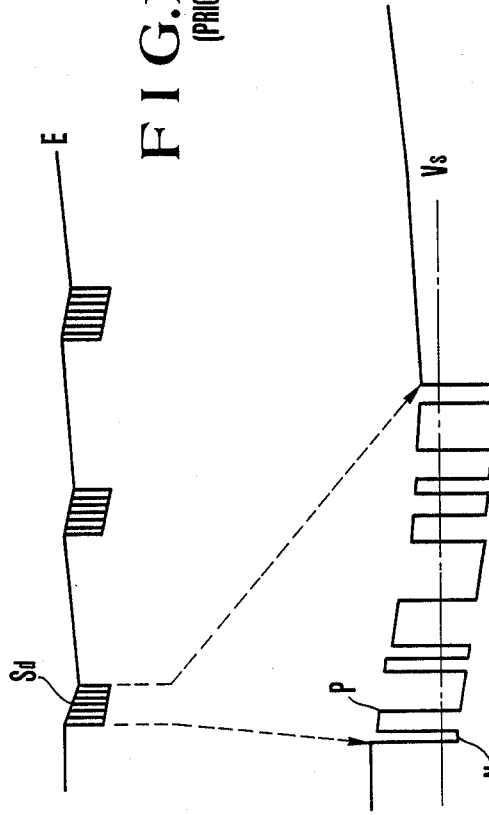

KEY TELEPHONE SYSTEM

BACKGROUND OF THE INVENTION

The present invention relates to a key telephone system, and more particularly a key telephone system with a data transmitting and receiving circuit provided in each terminal equipment or key telephone set coupled to a main unit, and is extremely advantageous when applied to a system, e.g. a key telephone system, to effect data transmission with a data signal having a substantially AC waveform being superimposed on a DC signal.

In key telephone systems comprising a main unit and a plurality of key telephone sets, each key telephone set is connected to the main unit through a pair of speech lines and a set of signal lines. Such systems are adapted to supply electrical power from the main unit to each key telephone set via the signal lines or both the speech lines and signal lines and to superimpose a data signal having a substantially AC waveform on a power supply voltage to effect transmission of the data signal by using the signal lines. In the prior art, it is known to employ a pulse-like signal varying in a negative direction to the data signal and to superimpose the pulse signal on a DC voltage applied to the signal lines.

However, as seen from FIG. 11A showing a waveform on the signal lines, a DC voltage E gradually lowers according as the superposition of a data signal Sd progresses and gradually rises from a time at which the application of the data signal Sd is removed. Such signal changes repeat, with the result that the power supply voltage changes. In addition, as seen from a partially enlarged view shown in FIG. 11B, a reference voltage Vs for detection used in a receiver circuit is fixed in its level, resulting in an unstable detection when the DC voltage is lowered. The drift of DC voltage E is due primarily to the distributed capacitance of the signal lines and transformer characteristics. The drift is particularly severe in systems employing "phantom" power supplies, wherein pairs of transmission lines are maintained at different relative potentials.

For stabilizing such an unstable detection, means as disclosed in Japanese Patent Publication No. 59-37612 and Japanese Patent Application Laid-open No. 59-91765 are already known.

However, the means disclosed in these prior art publications is only effective for a two-level or binary signal. Where an AC signal is superimposed on a DC voltage to change the DC voltage in both positive and negative directions, there occurs a need to handle a three-level or trinary signal. The means disclosed in the above-mentioned prior arts are not practically acceptable for the purpose of detecting such a three-level signal as a two-level signal.

SUMMARY OF THE INVENTION

A main object of the present invention is to provide a key telephone system wherein a data signal provides a stabilized receiving condition and excellent advantages when applied to various kinds of data signal transmission.

To achieve this object, there is provided a key telephone system comprising a main unit and a plurality of key telephone sets, and a pair of transmission lines connecting said main unit and each of said key telephone sets, a data signal of a substantially AC waveform being transmitted through said transmitting lines from said main unit to one of said key telephone sets, each of said main unit and said key telephone sets including a data receiving circuit and a data transmitting circuit, said data receiving circuit comprising a transformer with a primary winding and a secondary winding, said primary winding being connected to said pair of transmission lines, a voltage dividing circuit constituted by a plurality of resistors, a junction between said resistors being connected to one end of said secondary winding of said transformer to apply a divided voltage; a comparator circuit with a comparison input and a reference input, said comparison unit being connected to other end of the secondary winding of said transformer, a reference voltage control circuit for receiving said divided voltage and an output of said comparator circuit to selectively supply said reference input of said comparator circuit with a first or second reference voltage, said first reference voltage being higher than said divided voltage, said second reference voltage being lower than said divided voltage.

BRIEF DESCRIPTION OF THE DRAWINGS

The features and advantages of a key telephone system according to the present invention will become more apparent from the following description taken in conjunction with the accompanying drawings, in which:

FIGS. 5A and 5B show waveforms of signals of circuit components of the key telephone system shown in FIG. 4, respectively, FIGS. 11A and 11B show a wave form on the signal lines in the prior art system.

DESCRIPTION OF PREFERRED EMBODIMENTS

The present invention will be described in detail in connection with preferred embodiments with reference to attached drawings.

Figure 1:
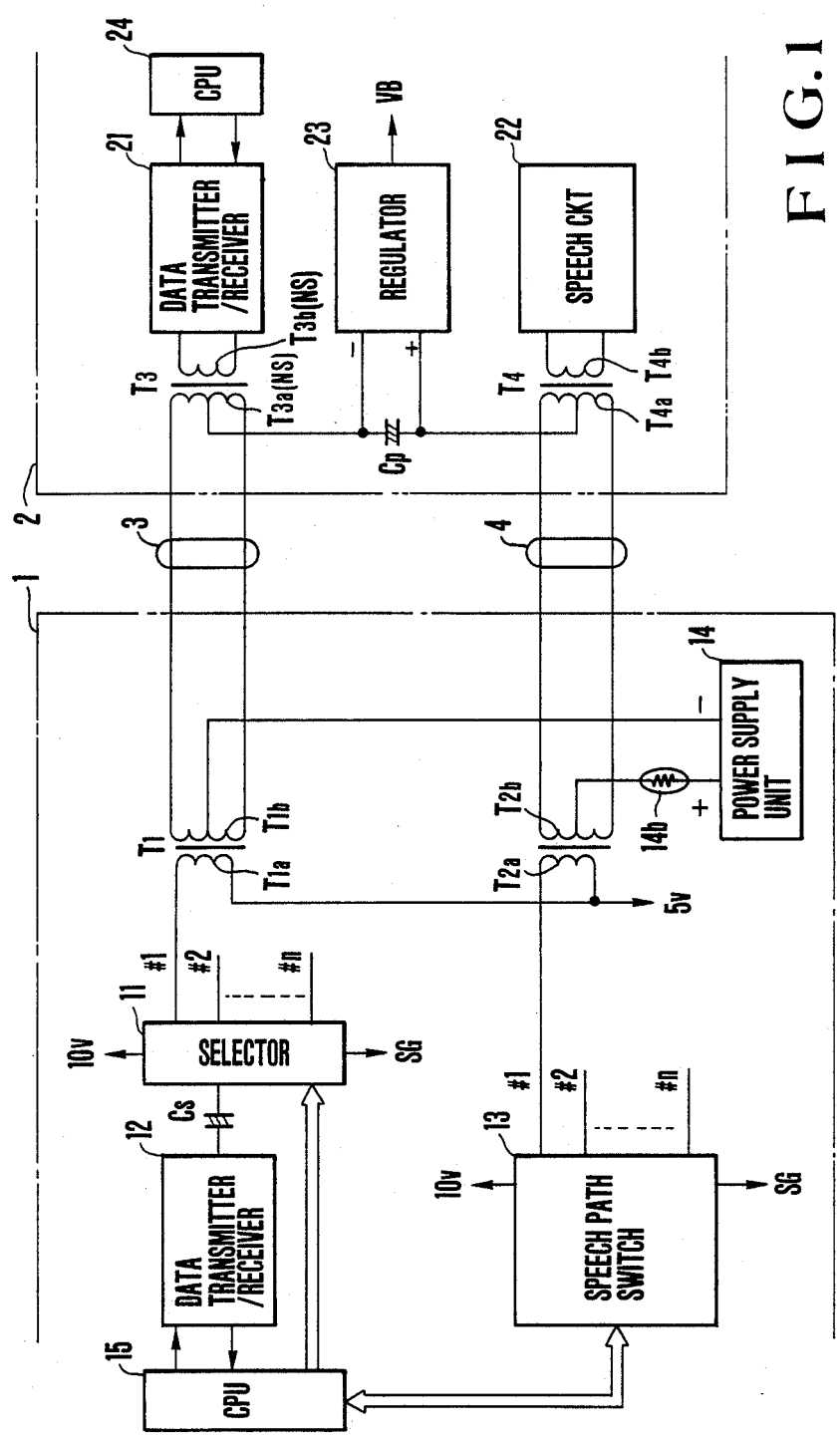
FIG. 1 is a block diagram illustrating a key telephone system to which a key telephone system according to the present invention is applied.

Referring to FIG. 1, there is shown a key telephone system according to the present invention. A main unit 1 and a key telephone set 2 are connected by a pair of signal lines 3 and a pair of speech lines 4. To both ends of the signal lines 3, transmformens $T_1$ and $T_3$ are connected, respectively. Similarly, to both ends of the speech lines 4, transformers $T_2$ and $T_4$ are connected, respectively. To a primary winding $T_{1a}$ of the transformer $T_1$, a selector 11 of an analog switch is connected. To this selector 11, a data transmitting and receiving unit 12 is connected through a capacitor $C_s$. On the other hand, to a primary winding $T_{2a}$ of the transformer $T_2$, a speech path switch 13 constituted with an analog switch for switching connection is connected. The main unit 1 further comprises a power supply unit 14 having a negative terminal connected to a neutral point provided at a secondary windin $T_{1b}$ of the transformer $T_1$ and a positive terminal connected to a neutral point provided at a secondary winding $T_{2b}$ through a current limiting posistor $14b$, thus providing a phantom power supply. In addition, the main unit is provided with a processor (CPU) 15 coupled to the selector 11, the data transmitter and receiver 12 and the speech path switch 13 to control them.

On the side of the key telephone set 2, a transmitting and receiving unit 21 is connected to a primary winding $T_{3b}$ (Np) of the transformer $T_3$. Further, to a primary winding $T_{4b}$ of the transformer $T_4$, a speech circuit 22 is connected. Between neutral points at the secondary windings $T_{3a}$ and $T_{4a}$ of the transformers $T_3$ and $T_4$, a stabilizer unit 23 for power extraction and a smoothing capacitor $C_P$ are connected. Thus, power fed from the main unit 1 to the key telephone set 2 through the signal and speech lines 3 and 4 is stabilized. The stabilizer is therefore used to supply a local power voltage VB thus stabilized to components of key telephone set 2 which require the local power. The key telephone set 2 is further provided with a processor (CPU) 24 for controlling the data transmitter and receiver 21.

In the main unit 1, the selector 11 and the speech path switch 13 are connected to other key telephone sets of the same configuration as the key telephone set 2 via routes similar to the route including the transformers $T_1$ and $T_2$, and the signal and speech lines 3 and 4. Further, to the selector 11 and the speech path switch 13, a power supply circuit of 10 volts for an analog switching and a common circuit SG (not shown) are connected, respectively. To one end of the primary winding ($T_{1a}$, $T_{2a}$) of each of the transformers $T_1$ and $T_2$, a power supply voltage of 5 volts is applied. Further, the other ends thereof are connected to the selector 11 and the speech path switch 13, respectively.

Accordingly, in accordance with a control of the CPU 15, the selector 11 selects one of key telephone sets #1 to #n. In response to this select operation, sending of control data from the transmitter and receiver 12, reception of the control data by the transmitter and receiver 21, sending of operational data from the transmitter and receiver 21, and reception of the operational data by the transmitter and receiver 12 are carried out by way of signal lines 3 through the transformers $T_1$ and $T_3$. Depending upon the contents of the data transmission stated above, the CPU 15 effects a control of the speech path switch 13. Thus, the speech circuit 22 is subject to switching connection through the transformers $T_2$ and $T_4$ and the speech lines 4. As a result, the speech operation is carried out by the speech circuit 22 and indication etc. on the side of the key telephone set 2 is effected depending upon the reception of the control data by the transmitter and receiver 21.

Figure 2:
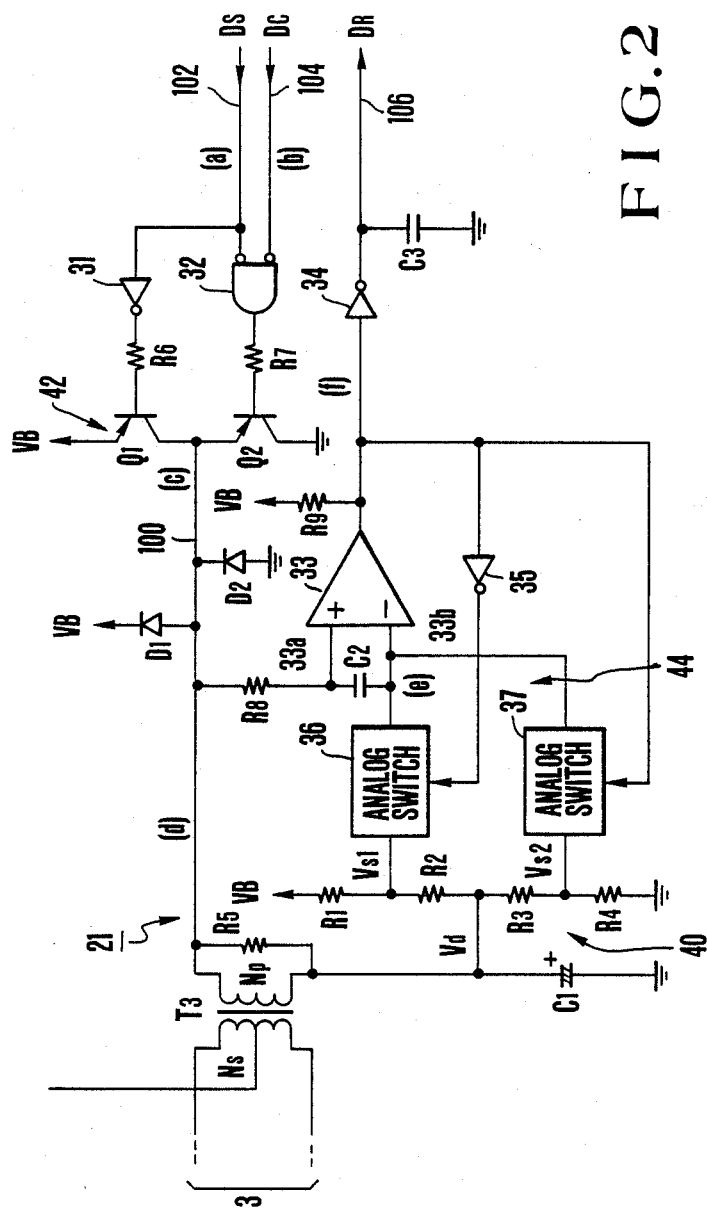
FIG. 2 is a circuit diagram illustrating an embodiment of a key telephone system according to the present invention.

FIG. 2 is a circuit diagram showing an example of the transmitter and receiver 21 provided on the side of the key telephone set. To one end of the primary winding $N_p$ of the transformer $T_3$ of which secondary winding $N_s$ is connected to the signal lines 3, a divided voltage $V_d$ determined by a voltage dividing circuit 40 comprising resistors $R_1$ to $R_4$ is applied. A capacitor $C_1$ for AC shunt is connected between the one end of the primary winding $N_p$ of the transformer $T_3$ and ground. The voltage dividing circuit 40 is operative to divide the power supply voltage VB (corresponding to the local power voltage) to produce the divided voltage $V_d$ and at the same time to produce a first reference voltage $V_{s1}$ higher than the divided voltage $V_d$ and a second reference voltage $V_{s2}$ lower than the divided voltage $V_d$.

Further, to the primary winding $N_p$ of the transformer $T_3$, an impedance matching resistor $R_5$ is connected in parallel. The transformer $T_3$ is electrically coupled to a driver circuit 42 comprised of a single-ended complementary push-pull circuit. More particularly, the single-ended complementary push-pull circuit 42 comprises a pair of transistors $Q_1$ and $Q_2$ of opposite conductivity types wherein the first transistor $Q_1$ has an emitter connected to the power supply voltage VB and a collector commonly connected to a collector of the second transistor $Q_2$ of which emitter is connected to a common potential terminal (ground in this example). The other end of the primary winding $N_p$ of the transformer $T_3$ is connected to a node or junction of the respective collectors of both the transistors $Q_1$ and $Q_2$ by way of a line 100. Further, noise eliminating diodes $D_1$ and $D_2$ are coupled between the power supply voltage VB and the line 100 and between the line 100 and ground in a manner that they limit the voltage appearing on line 100 to the range between approximately ground and VB". The first transistor $Q_1$ has a base connected to a transmission data signal input line 102 through a resistor $R_6$ and an inverter 31. The second transistor $Q_2$ has a base connected, through a resistor $R_7$, to an input inverting type AND gate 32 coupled to the data signal input line 102 and a control signal input line 104. Thus, an on/off control of the driver circuit 42 is carried out depending upon logical states of a data signal $D_s$ and a control signal $D_c$ delivered through the input lines 102 and 104.

Figure 3A:
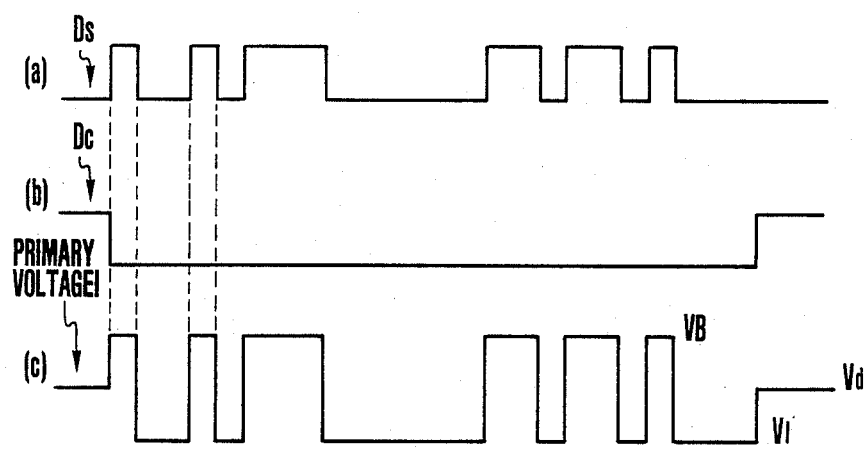
FIGS. 3A and 3B show waveforms of signals of circuit components of the key telephone system shown in FIG. 2, respectively.
Figure 3B:
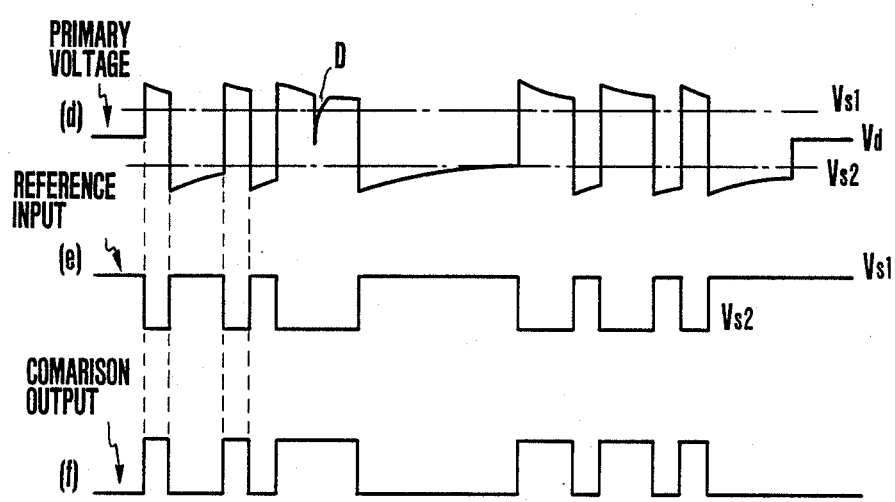

Referring to FIGS. 3A and 3B, there are shown waveforms of circuit components in the circuit shown in FIG. 2. FIG. 3A shows waveforms on the transmitting side wherein symbols (a), (b) and (c) represent the transmit data signal $D_s$, the control signal $D_c$ and a voltage appearing on the primary winding $N_p$ (which will be simply referred to as the "primary voltage", hereinafter), respectively. When the transmit data signal $D_s$ (a) represents "L" (low level) and the control signal $D_c$ (b) represents "H" (high level) i.e. when data is not transmitted, the inverter 31 produces an output of "H" and the AND gate 32 produces an output of "L". As a result, both the transistors $Q_1$ and $Q_2$ are cut off. Thus, no current flows through the primary winding $N_p$, and the divided voltage $V_d$ appears as the primary voltage (c). When the control signal (b) shifts to "L" and the transmit data signal (a) shifts to "H", the output of the inverter 31 shifts to "L" in response to "H" of the transmit data signal (a) to turn on the transistor $Q_1$, while the ouput of the AND gate 32 remains "L" to place the transistor $Q_2$ in cut off condition. As a result, the primary voltage (c) rises to the power supply voltage VB. In contrast, when the transmit signal (a) shifts to "L", the output of the inverter 31 shifts to "H" to cut off the transistor $Q_1$ and the output of the AND gate 32 shifts to "H" to turn on the transistor $Q_2$, thus lowering the primary voltage (c) to a lower voltage Vl (substantially ground level).

Accordingly, by determining values of the resistors $R_1$ to $R_4$ so that the relationship of $V_B-V_d$ to $V_d-Vl$ is established on the basis of the complementary on/off operation of the transistors $Q_1$ and $Q_2$, the combined average value of positive and negative pulses when the divided voltage $V_d$ is taken as a reference substantially becomes zero. A waveform corresponding to such changes is induced across the secondary winding $N_s$. The waveform thus induced is superimposed on a DC voltage supplied from the power supply 14. As a result, the charge and discharge operation of the capacitor $C_p$ does not occur, with the result that the DC voltage is not changed.

The driver circuit 42 comprising transistors $Q_1$ and $Q_2$ employed in this embodiment is suitable in that output impedance is low when in the "on" state and it can provide sufficient excitation of transformer $T_3$ with respect to the lines 3 having distributed capacitance etc. In addition, it is not necessarily required that time periods of "H" and "L" of the transmit data signal (a) be generally the same. The values of the resistors $R_1$ to $R_4$ may be determined depending upon circuit circumstances in a manner that the average value of the primary voltage is substantially equal to zero.

Primary winding $N_p$ serves as a secondary winding at the time of reception. A non-inverting input terminal 33a of a comparator 33 comprising a differential amplifier is connected to the line 100 via a resistor R8 to act as a comparison input. To an inverting input terminal 33b of the comparator 33 serving as a reference input, either of reference voltages $V_{s1}$ and $V_{s2}$ is selectively applied through analog switches 36 and 37 constituting a reference voltage supply circuit 44. Between the input terminals 33a and 33b, a noise eliminating capacitor $C_2$ is connected. The output of the comparator 33 is coupled to the power supply voltage VB through a pull-up resistor $R_9$. Depending upon voltage changes on the comparison input of the comparator 33, the comparator 33 is operative to produce a binary output of "H" and "L". The binary output is inverted in its logical level by an inverter 34. The inverted binary output is in turn subject to noise eliminating capacitor $C_3$. Then, the inverted binary output thus noise-eliminated is outputted as received data signal $D_R$ through a signal output line 106, and is also delivered to the analog switch 36 via the inverter 35 and directly to the analog switch 37 as switch control signals.

FIG. 3B shows waveforms of circuit components on the receiving side wherein symbols (d), (e) and (f) represent the primary voltage, the reference input and the comparison output, respectively.

As seen from this figure, since the comparator 33 is designed to produce the "L" output when the primary voltage (d) is equal to the divided voltage $V_d$ in an ordinary condition, the comparison output (f) represents under this condition "L" to turn on the analog switch 36, with the result that the reference input (e) of the comparator 33 is locked to the reference voltage $V_{s1}$. On the other hand, when the receive data signal (d) delivered through the transformer $T_3$ varies in a positive direction to exceed the reference voltage $V_{s1}$, the comparison output (f) shifts to "H". As a result, the analog switch 36 is cut off but the analog switch 37 is turned on, thus delivering reference voltage $V_{s2}$ to the reference input. For a time period during which the voltage value of the receive data signal (d) is above the reference voltage $V_{s1}$, the comparison output (f) remains "H". When the voltage of the receive data signal (d) falls below the reference voltage $V_{s2}$, the comparison output (f) shifts to "L". In response to this, the analog switches 36 and 37 are again returned to on and off states, respectively, thus to deliver the reference voltage $V_{s1}$ to the reference input (33b) of the comparator 33. For a time period during which the voltage of the receive data signal (d) falls below the reference voltage $V_{s2}$, the comparison output (f) remains "L". Depending upon changes in the receive data signal (d), the above-mentioned operation will be repeatedly carried out.

In this manner, depending upon the output level of the comparison output (f), the reference voltage is optimumly selected, to insure that even if there occurs a waveform distortion due to transmission through the signal lines 3 and the transformers $T_1$ and $T_3$, the binary comparison output (f) of "H" and "L" can be securely obtained. Further, even if there occurs a wave change D due to noises etc., such a change does not affect the comparison output (f). In addition, even when the peak value of the data signal $S_d$ varies as shown in FIG. 11B, a stabilized detection can be performed by selecting a suitable reference voltage.

Then, the comparison output (f) is inverted by the inverter 34 to deliver the inverted comparison output as received signal $D_R$ to the CPU 15, thus ensuring steady and stable reception of the receive data signal (d).

During the transmission of the transmit signal $D_s$, the CPU 15 may inhibit acceptance of the received signal $D_R$. Alternatively, CPU 15 may continue to monitor received signal $D_R$ during transmission of transmit signal $D_S$ to verify coincidence of the two signals, thereby confirming proper operation of the circuitry. In such cases, a transmitter and receiver 12 providing the main unit 1 may be configured in the same manner as the transmitter and receiver 12 shown in FIG. 1.

Accordingly, the DC voltage delivered from the main unit 1 will not vary under the influence of a data signal, and may be delivered, as a fixed voltage, to the key telephone set 2. For this reason, on the receiving side, it is possible to effect a stable and steady reception of the data signal without being affected by changes in peak value, waveform distortion etc. of the data signal.

In addition to the implementation stated above, the present invention may be practiced as follows. In a system similar to that shown in FIG. 1, electrical power from the main unit 1 may be superimposed on the signal lines 3 and correspondingly, the connection of the power supply unit 14 and stabilizer 23 may be established with a single pair of transmission lines. Also, the transmitter and receiver 12 may be provided for each key telephone set. Further, the transmitter and receiver 21 shown in FIG. 2 may be modified so that the reference voltage $V_{s1}$ and $V_{s2}$ are produced independently of the divided voltage $V_d$ by using a different circuit. Furthermore, transistors of the same conductivity type may be employed as the transistors $Q_1$ and $Q_2$ and may be driven in a complementary fashion. In addition, the analog switches 36 and 37 may be replaced by selectors or the like.

Further, it is not required to necessarily use both the transmitting circuit and the receiving circuit shown in FIG. 2. Even when either one of them is employed and a conventional circuit is applied to the other, substantially the same advantages as attained with the above-mentioned embodiment according to the present invention will be obtained. Furthermore, the present invention is applicable not only to a key telephone system but also to various kinds of transmission systems where similar data signals are used.

In addition, the waveform of the data signals is not limited to pure pulses employed in the above-mentioned embodiment. Various kinds of waveforms, as long as they vary in positive and negative directions, can be selectively used depending upon required conditions. Further, the waveform of the receive data signal may be the same as that of the transmit data signal or that of the prior art shown in FIG. 11A or 11B.

As seen from the foregoing description, when the present invention is practiced as a data transmitting circuit to transmit a data signal having a substantially AC waveform superimposed on a DC voltage, there is no possibility that change in the DC voltage will occur, thus providing great advantages when applied to the sending of various kinds of data signals. Further, when the present invention is practiced as a data receiving circuit for receiving a data signal having a substantially AC waveform superimposed on a DC signal and changing it into a binary receive signal, stable and steady reception can be realized by employing the circuit arrangement for automatic selection of a suitable reference voltage, thus providing great advantages when applied to the reception of various kinds of data signals.

In the above-mentioned embodiment, the transmitting and receiving circuit applied to a key telephone system has been described. This circuit is operative to transmit a data signal varying in positive and negative directions superimposed on a DC voltage applied to a pair of signal lines and to use a comparator operative to switch reference voltages depending upon the data signal, thereby to produce a binary receive data based on the positive and negative levels of the data signal.

As stated above, the circuit according to the above-mentioned embodiment is capable of automatically switching the reference voltage of the comparator depending upon the level of the data signal, thus ensuring detection of positive and negative levels of the data signal. However, the reference voltage is finally placed in a switched condition depending upon a level of a received data signal, with the result that the comparator holds an output level corresponding to this condition. Accordingly, unless this condition is initialized, there occurs an error in recognition of receive data at the time of receiving a subsequent data signal.

In such an event, if sending and receiving operations of a data signal are carried out at fixed periods and in synchronism with each other, there would not occur an error in recognition of the received data. However, a precise synchronization is required for realizing this, with the result that synchronized control of the transmission becomes difficult.

To solve this problem, a key telephone system employed in a modification to be described below of the present invention is provided with control means newly added to the circuit according to the previously described embodiment wherein the control means is operative to add a reset signal to a data signal and transmit a resultant signal onto the signal lines, the reset signal having a polarity required for initializing a switching condition of reference voltages before the received data is outputted from the comparator. Accordingly, this makes it possible to produce the received data after the reference voltage of comparator is necessarily initialized, resulting in no error in recognition of the received data. The transmitting and receiving circuit according to this modification is also applied to the key telephone system shown in FIG. 1.

Figure 4:
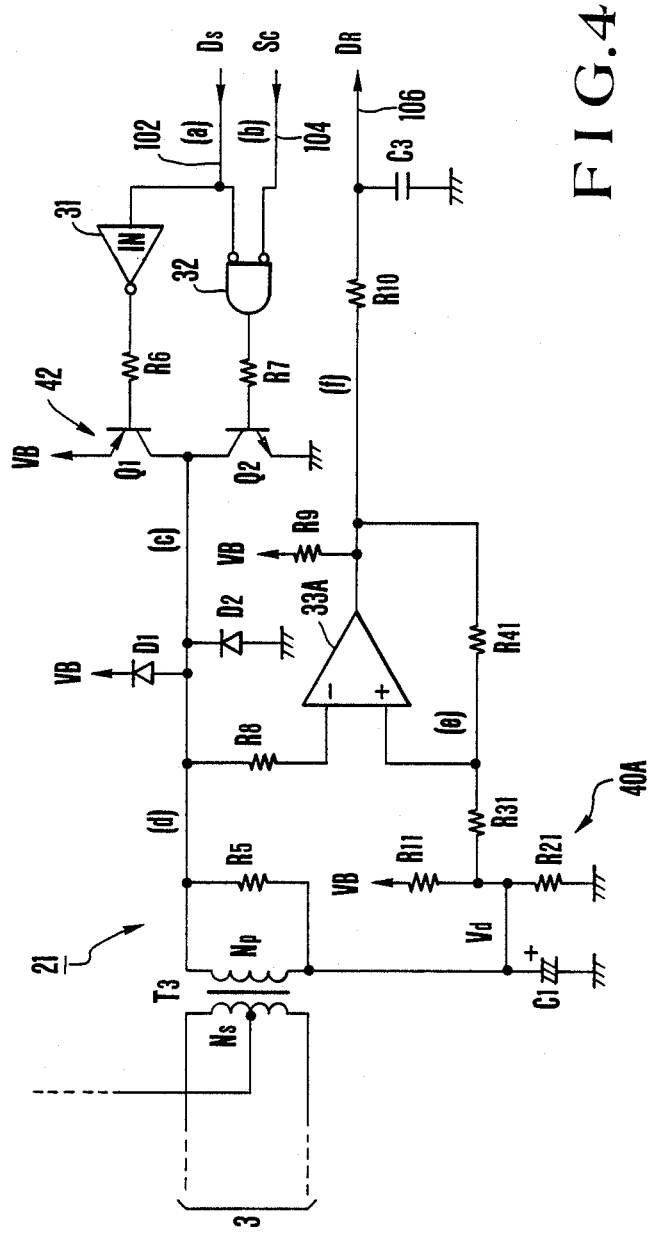
FIG. 4 is a circuit diagram illustrating a modification of a key telephone system according to the present invention.

FIG. 4 is a circuit diagram showing a modification of the data transmitter and receiver 21 provided in the key telephone set. Parts identical to those shown in FIG. 2 are designated by the same reference numerals and will not be described herein. The circuit shown in FIG. 4 comprises a voltage dividing circuit 40A comprising resistors $R_{11}$ and $R_{21}$ connected in series between the power supply voltage VB and ground and a comparator 33A having an inverting input terminal connected to the one end of the resistor $R_8$ and a non-inverting input terminal connected to the node of the resistors $R_{11}$ and $R_{21}$ through a resistor $R_{31}$. The comparator 33A is provided with a feedback resistor $R_{41}$ connected between its output terminal and the non-inverting input terminal to provide reference voltage (e). Resistors $R_{31}$ and $R_{41}$ comprise a voltage dividing network to provide reference voltage $V_{S1}$ (greater than $V_d$) when the output of comparator 33A is "H" and $V_{S2}$ (less than $V_d$) when the output of comparator 33A is "L". The comparator 33A is operative to produce a result through a resistor $R_{10}$ as a received data signal $D_R$.

Referring to FIG. 5A, there are illustrated waveforms of circuit components in the circuit shown in FIG. 4 at the time of transmission wherein symbols (a), (b) and (c) represent the transmit data signal $D_s$, the control signal $D_c$ and a voltage appearing on the primary winding, respectively. When the transmit data signal $D_s$ (a) represents "L" (low level) and the control signal $D_c$ (b) represents "H" (high level), i.e., when data is not transmitted, the inverter 31 produces an output of "H" and the AND gate 32 produces an output of "L". As a result, both the transistor $Q_1$ and $Q_2$ are cut off. Thus, on the other end of the primary winding $N_p$, the divided voltage $V_d$ appears as indicated by the primary winding voltage (c). On the other hand, when the control signal (b) shifts to "L" and the transmit data signal shifts to "L", the output of the inverter 31 shifts to "H" in response to "L" of the transmit data signal to cut off the transistor $Q_1$, while the output of the AND gate 32 shifts to "H" to turn on the transistor $Q_2$. As a result, the primary voltage (c) lowers to the voltage V1 (substantially ground level). In contrast, in response to "H", the output of the inverter 31 shifts to "L" to turn on the transistor $Q_1$ and the output of the AND gate 32 remains "L" to place the transistor $Q_2$ in cut off condition, thus elevating the primary voltage (c) to the power supply voltage VB.

Accordingly, as in the previous embodiment, by determining values of the resistors $R_{11}$ and $R_{21}$ so that the relationship of $V_B - V_d$ to $V_d - V1$ is established on the basis of the complementary on/off operation of the transistors $Q_1$ and $Q_2$, an average value of both changes in positive and negative directions referenced to the divided voltage $V_d$ substantially becomes zero. A waveform corresponding to such changes is induced across the secondary winding $N_s$. The waveform thus induced is superimposed on a DC voltage supplied from the power supply unit 14. As a result, the charge and discharge operation of the capacitor $C_p$ does not occur, thereby maintaining the DC voltage unchanged.

Primary winding $N_p$ serves as a secondary winding at the time of reception. An inverting input terminal of the comparator 33A comprising a differential amplifier is connected through the resistor $R_8$. To the non-inverting input terminal serving as a reference input, the divided voltage $V_d$ and an output voltage of the comparator 33A are delivered through the resistor $R_{31}$ and the positive feedback resistor $R_{41}$ respectively. The comparator 33A is operative to switch outputs so that when the output of the comparator 33A represents "H", the reference voltage rises to $V_{s1}$, while when "L", it lowers to $V_{s2}$.

As in the previous embodiment, the output of the comparator 33A is connected to produce a received data signal $D_R$ of binary form, which in turn is applied to an interrupt input terminal of the CPU 24 (FIG. 1).

FIG. 5B shows waveforms at the time of reception wherein (d), (e) and (f) represent the primary voltage (receive data signal), the reference input, and the comparison output, respectively.

As seen from (d) in FIG. 5B, the primary voltage is equal to the divided voltage $V_d$ in an ordinary condition. The comparator 33A is designed to produce the "L" output when the primary voltage (d) is equal to the divided voltage $V_d$ in an ordinary condition. The comparison output (f) represents "L" under this condition with the result that the reference input (e) is balanced at the value of $V_{s2}$. On the other hand, when the received data signal (d) delivered through the transformer $T_3$ varies in a negative direction to lower to the reference voltage $V_{s2}$, the comparison output (f) shifts to "H", thus providing reference voltage $V_{s1}$ as the reference input (e). For a time period during which the voltage of the received signal (d) is below the reference voltage $V_{s2}$, the comparison output (f) remains "H". When the voltage of the receive signal (d) is above the reference voltage $V_{s1}$, the comparison output (f) shifts to "L". In response to this, the reference voltage $V_{s2}$ is again given as the reference input (e). For a time period during which the voltage of the receive signal (d) is above the reference voltage $V_{s1}$, the comparison output (f) remains "L". Depending upon changes in the receive signal (d), the above-mentioned operation will be repeatedly carried out.

In this manner, depending upon the output level of the comparison output (f), the reference voltage is optimally selected, to ensure that even if there occurs a waveform distortion due to transmission through the signal lines 3 and the transformers $T_1$ and $T_3$, the binary comparison output (f) of "H" and "L" can be securely obtained. Further, even if there occurs a wave change D due to noises etc., such a change does not affect the comparison output (f).

However when receiving operation is completed under condition where the received data signal (d) remains in the negative direction, the comparison output (f) remains "H". According to this, the reference voltage remains $V_{s1}$. At the time of starting a next receiving operation, the CPU 24 recognizes the comparison output (f) which has been latched before the received data signal (d) becomes negative and hence, there will occur an error in judgement of the received data signal $D_R$. Accordingly, it is necessary to initialize the condition of the comparator 33A before the CPU 24 recognizes the received data signal $D_R$.

Figure 6:
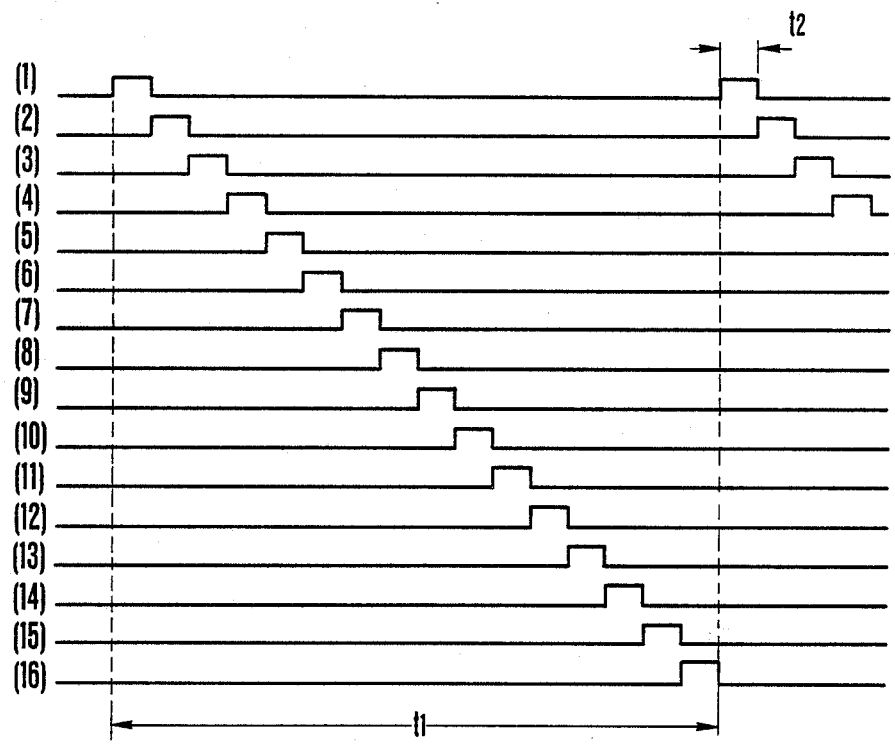
FIG. 6 shows a timing chart of a data transmitting and receiving operation between a main unit and each key telephone set.

FIG. 6 is a timing chart showing the data transmitting and receiving operation between the main unit 1 and the respective key telephone sets. The data transmitting and receiving operation for each of the key telephone sets, as symbolized at (1) to (16) in FIG. 6, is sequentially carried out cyclically at a period $t_1$ of 80 m sec. A time period $t_2$ during which the data is transmitted and received is set at e.g. 5 m sec.

Figure 7A:
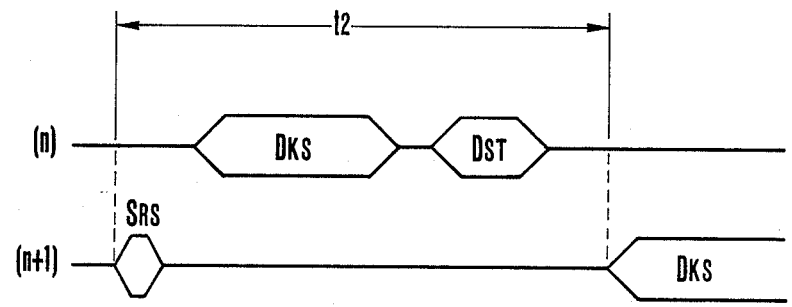
FIGS. 7A and 7B show details of a data transmitting and receiving time period in the operation shown in FIG. 6, FIGS. 8, 9A and 9B are flowcharts showing a control executed by CPU provided in the main unit.
Figure 7B:
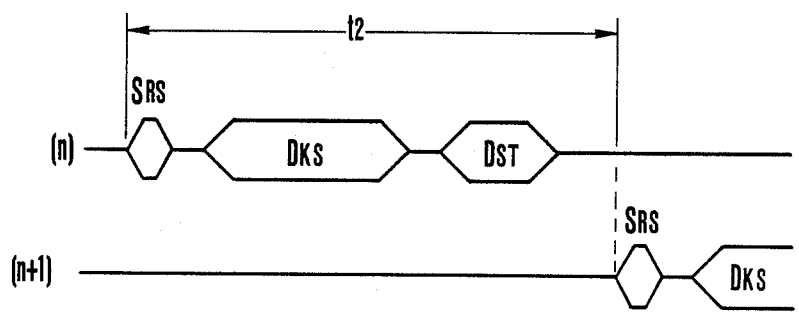

The time period $t_2$ is broken down in FIG. 7A or 7B. In FIG. 7A, before control data $D_{KS}$ is transmitted from the main unit 1 to the n-th key telephone set (n), a reset signal $S_{RS}$ is transmitted to the subsequent (n+1)-th key telephone set (n+1), and then the transmission of the control data $D_{KS}$ to the key telephone set (n) and an operational data $D_{ST}$ from the key telephone set (n) responsive thereto is carried out. A signal varying in the positive direction is used as the reset signal $S_{RS}$ and a signal having a polarity to initialize the comparator 33A shown in FIG. 4 is transmitted during a time period necessary for initialization.

Alternatively, as shown in FIG. 7B, the reset signal $S_{RS}$ is transmitted to the key telephone set (n) and key telephone set (n+1) immediately before the control data $D_{KS}$ is transmitted, thus performing initialization of the comparator 33A.

It is feasible that internal timing circuits of the key telephone set itself provides the reset signal $S_{RS}$ to initialize comparator 33A.

Figure 8:
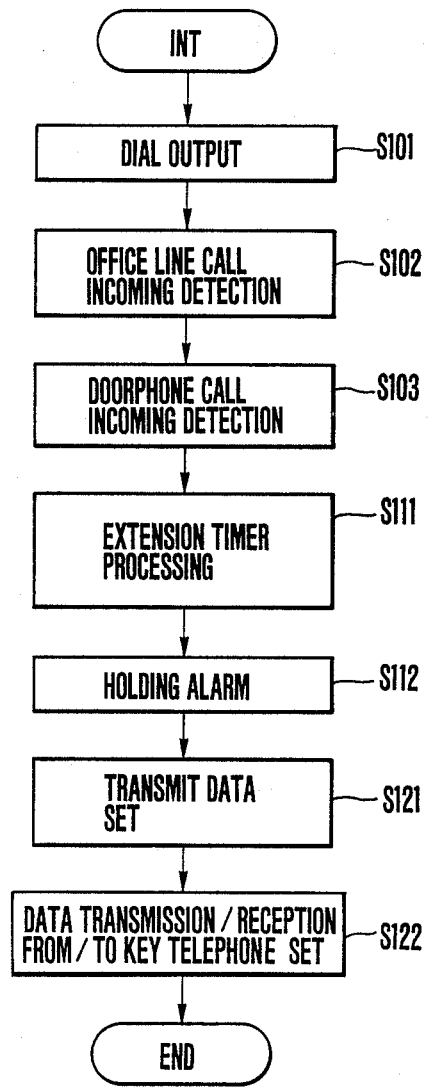
Figure 9:
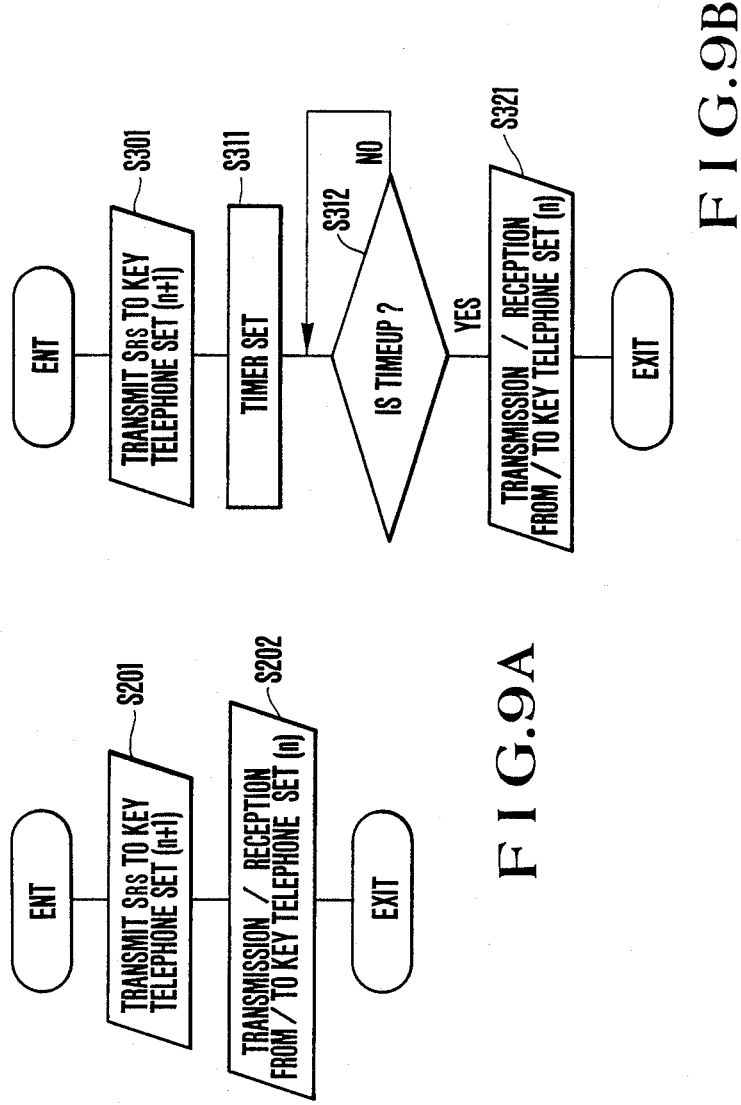

FIGS. 8, 9A and 9B are flowcharts showing control operations effected by the CPU 15 on the side of the main unit 1 wherein FIG. 8 shows a main routine for interruption processing which is executed by providing an interruption with respect to an ordinary processing at a period of, for example, 5 m sec.

In a step S101 for dial output processing, dial calling control is carried out, and in the next step S102 for office line calling detection processing, a check as to whether a call incoming from the office line is present or absent is made. In a step 103 for doorphone call incoming detection processing, a check as to whether a call incoming from the doorphone is present or absent is made.

Subsequently, in a step S111 for extension timer processing, a processing for restricting each control time in an exchange connection between the mutual extensions is carried out. Then, in a step S112, a holding alarm timer processing for preventing the holding condition from being left intact is carried out. In the next step S121, transmission data with respect to the key telephone set to which data transmitting and receiving operation is to be applied is set in a register in the CPU 15. The contents of the register is outputted to the transmitter and receiver 12. In the next step S122, an operation for transmitting data to the key telephone set and receiving it therefrom is carried out. The processings subsequent to the step S101 are repeatedly executed cyclically at a fixed period. In each processing, the data transmitting and receiving operations for individual key telephone sets are sequentially executed through the steps S121 and S122, in a manner as shown in FIG. 6.

FIGS. 9A and 9B are flowcharts showing details of the step S122, making correspondence to FIGS. 7A and 7B, respectively.

As shown in FIG. 9A, in a step S201, the reset signal $S_{RS}$ is transmitted to the key telephone set (n+1) to which the subsequent data transmitting and receiving operation is applied. Thereafter, in the next step S202, the present transmitting and receiving operation is applied to the key telephone set (n). Alternatively, as shown in FIG. 9B, in a step S301, the reset signal $SR_S$ is transmitted to the key telephone set (n). In the next step S311, the timer is set. Then, in step S312, a judgement as to whether the timer has expired or not is made. As a result, when it is confirmed that the timer has expired, indicating YES, the control shifts to the next step S321 to apply the transmitting and receiving operation to the key telephone set (n).

Figure 10:
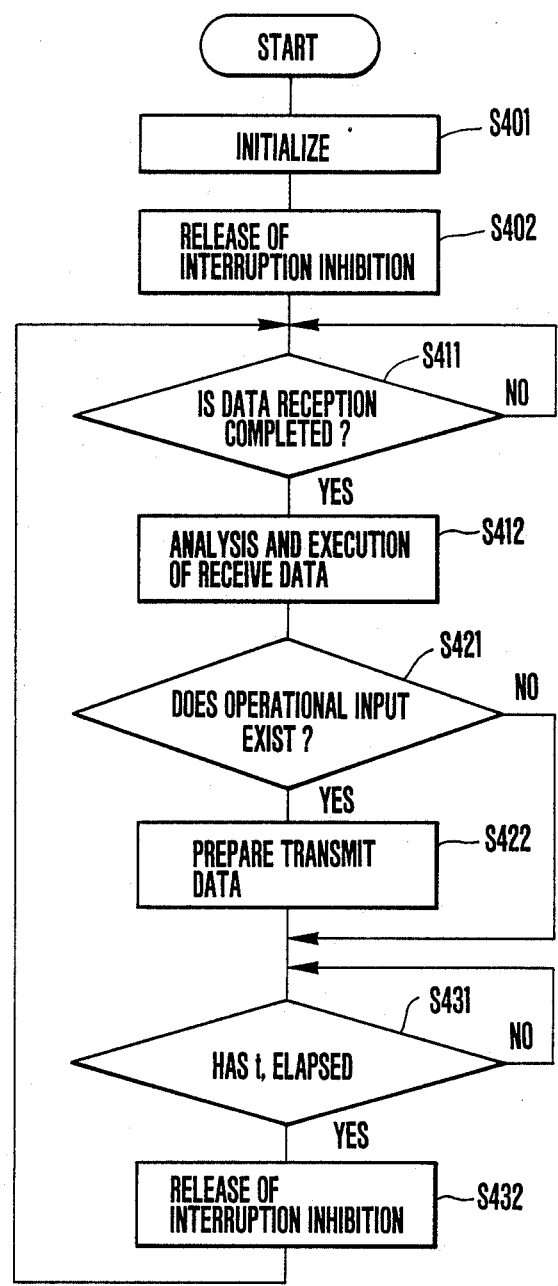
FIG. 10 is a flowchart showing a control executed by CPU provided in the key telephone set.

FIG. 10 is a flowchart showing a control operation effected by the CPU 24 on the side of the key telephone set 2. First is to make an initialization of the system in a step S401. Next is to release the inhibition of an interruption input by the received data signal $D_R$ in a step S402. In the next step S411, a judgement as to whether data reception is completed or not is made. As a result, when it is judged that the data reception is completed, indicating YES, control for an analysis and execution of the received data is effected in a step S412. In the next step S421, a judgement as to whether there exists an operational input or not is made. As a result, when it is judged that the operational input exists, indicating YES, the control shifts to the next step S422 to prepare transmit data. Then, the control shifts to a step S431 to make a judgement as to whether a time period $t_1$ has elapsed by using an internal timer in the CPU 24. When it is judged that the time period $t_1$ has elapsed, indicating YES, an operation is carried out to again release the inhibition (applied by interruption processing not shown) of the interruption in the next step S432. After the execution of this step is completed, the control is returned to the above-mentioned step S411. Subsequently, the same control as stated above is repeatedly effected.

Accordingly, when the step S402 or S432 is executed on the side of the key telephone set 2, the CPU 24 recognizes the received data signal $D_R$. Prior to this processing, the reset signal $S_{RS}$ is given by the step S201 or S301 thereby to initialize the comparator 33A. Accordingly, there is no possibility that the CPU 24 will recognize erroneous data on the received data signal $D_R$.

The transmitter and receiver 12 on the side of the main unit 1 is of the same configuration as the transmitter and receiver 21 shown in FIG. 4. Upon sending the reset signal $S_{RS}$, the transmitter and receiver 12 itself is initialized (in the same manner as previously described in connection with comparator 33A), resulting in no error in recognition of the operational data.

In addition, in the transmitter and receiver 21 on the side of the key telephone set 2, when the reset signal $S_{RS}$ is sent by the transmit data signal $D_S$, there is a possibility that spike noises occur due to inductance components of the transformer $T_3$, with the result that the comparator 33A is held with a "H" output. However, since the reset signal is transmitted from the main unit 1, such an undesirable phenomenon cannot occur.

A timing for transmitting the reset signal and its pulse width may be determined depending upon utilization conditions, resulting in no requirement of high precision. Further, it is possible to generate a reset signal by using a particular circuit therefor in place of the CPU. Any means for generating a reset signal may be applicable. Further, the modified embodiment of the present invention is applicable not only to the key telephone system but also to various data transmitting and receiving system equivalent thereto, and other modifications themselves are possible in which the data signals used may either be of a non-return-to-zero (NRZ) type or of a return-to-zero (RZ) type, for example. Various kinds of waveforms can be selectively used depending upon utilization conditions. In addition, the switching of the reference voltage for the comparator 33A can be carried out in the same manner by using a switching element etc.

As stated above, the last-mentioned implementation easily and steadily effects initialization of the holding condition of the comparator. Accordingly, where switching of reference voltages for the comparator is carried out depending upon a level of a data signal, there is no possibility that received data is erroneously recognized, thereby ensuring wide application of various data transmitting and receiving system.

What is claimed is:

1. A key telephone system comprising a main unit and a plurality of key telephone sets, and a pair of transmission lines connecting said main unit and each of said key telephone sets, a data signal of a substantially AC waveform being transmitted through said transmitting lines from said main unit to one of said key telephone sets, each of said main unit and said key telephone sets including a data receiving circuit and a data transmitting circuit, said data receiving circuit comprising:
   a transformer with a primary winding and a secondary winding, said secondary winding being connected to said pair of transmission lines;
   a voltage dividing circuit constituted by a plurality of resistors, a junction between said resistors being connected to one end of said primary winding of said transformer to apply a divided voltage;
   a comparator circuit with a comparison input and a reference input, said comparison input being connected to other end of the primary winding of said transformer;
   a reference voltage control circuit for receiving said divided voltage and an output of said comparator circuit to selectively supply said reference input of said comparator circuit with a first or second reference voltage,
   said first reference voltage being higher than said divided voltage, said second reference voltage being lower than said divided voltage.

2. A key telephone system according to claim 1, wherein said comparator circuit comprises a differential amplifier.

3. A key telephone system according to claim 1 wherein said reference voltage control circuit comprises a pair of analog switches operative to select either of said first and second reference voltages in response to an output level of said comparato circuit.

4. A key telephone system according to claim 1, wherein said reference voltage control circuit comprises two resistors connected in series, said divided voltage being supplied to an end of one of said resistors, said output of said comparator circuit being supplied to an end of the remaining resistor, and said reference input of said comparator circuit being connected to a juncture between said resistors.

5. A key telephone system according to claim 1, wherein said data signal has a pulse waveform of non-return-to-zero type.

6. A key telephone system according to claim 1, wherein said data signal has a pulse waveform of return-to-zero type.

7. A key telephone system according to claim 1, which further comprises a control means for receiving said output of said comparator circuit to analyze it and for permitting said receiving operation at a predetermined cycle synchronous with that of said data signal.

8. A key telephone system according to claim 1, wherein said data transmitting circuit comprises:
   a driver circuit responsive to a data signal with first and second transistors, said first and second transistors being connected in series between an AC power supply and a ground, the juncture of said first and second transistors being connected to the other end of said primary winding of said transformer; and a transistor control means for controlling ON/OFF operation of said first and second transistors so that when the data signal is not transmitted both transistors are turned off and when the data signal is transmitted one of said first and second transistors is turned on in accordance with the data signal.

9. A key telephone system according to claim 7, wherein said transistors are constituted by complementary transistors with opposite conductivity types.

10. A key telephone system according to claim 1, wherein said transmitting circuit comprises a control means for transmitting a signal to access said reference voltage control circuit of said data receiving circuit so that either one of said first and second reference voltages is supplied to said reference input of said comparator circuit.

11. A key telephone system according to claim 1, wherein said data transmitting circuit comprises a control means for transmitting a signal through said transmission lines to access said reference voltage control circuit of said transmitted data receiving circuit so that either one of said first and second reference voltages is supplied to said reference input of said comparator circuit.

12. A key telephone system according to claim 8, wherein said system further comprises a pair of speech lines arranged between said main unit and said key telephone sets, each of said main unit and said key telephone sets including a transformer coupled with said speech lines.

13. A key telephone system according to claim 12, wherein said main unit further comprises a power supply unit, and each of said key telephone sets further comprises a power supply circuit including a regulator for regulating power transmitted from said power supply unit through a circuit constituted by said transmission lines, said speech lines and transformers arranged at both sides thereof.

14. A data transmitting circuit comprising:
a transformer with a primary winding and a secondary winding, said secondary winding being connected to a pair of transmission lines;
a voltage dividing circuit consisting of a plurality of resistors, a junction between said resistors being connected to a first end of said primary winding of said transformer to apply a divided voltage thereto;
a driver circuit with first and second transistors responsive to a data signal, said first and second transistors being connected in series between a DC power supply and a ground, the juncture of said first and second transistors being connected to a second end of said primary winding of said transformer; and
a transistor control means for controlling ON/OFF operation of said first and second transistors so that when the data signal is not transmitted, both transistors are turned off and when the data signal is transmitted one of said first and second transistors is turned on in accordance with the data signal.

15. A data receiving circuit comprising:
a transformer with a primary winding and a secondary winding, said secondary winding being connected to a pair of transmission lines upon which a data signal is impressed;
a voltage dividing circuit consisting of a plurality of resistors, a first junction between said resistors being connected to a first end of said primary winding of said transformer to supply a divided voltage, a second junction to supply a first reference voltage higher than said divided voltage, and a third junction to supply a second reference voltage lower than said divided voltage;
a comparator circuit having a comparison input, a reference input and an output which is a binary voltage signal based on the relative voltages at said inputs, said comparison input being connected to a second end of said primary winding of said transformer;
a reference voltage control circuit for receiving said first and second reference voltages and said comparator output to selectively supply said reference input of said comparator circuit with said first reference voltage when said comparator output is a first voltage and with said second reference voltage when said comparator output is a second voltage;
wherein said comparator output is a first voltage level when said comparison input is less than said second reference voltage and is a second voltage level when said comparison input is greater than said first reference voltage.

16. A data receiving circuit comprising:
a transformer with a primary winding and a secondary winding, said secondary winding being connected to a pair or transmission lines upon when a data signal is impressed;
a comparator circuit having a comparison input, a reference input and an output which is a binary voltage signal based on the relative voltages at said inputs, said comparison input being connected to a second end of said primary winding of said transformer;
a voltage dividing circuit consisting of a plurality of resistors, a first junction between said resistors being connected to a first end of said primary winding of said transformer to supply a divided voltage and a second junction connected to said reference input of said comparator circuit to supply a reference voltage with a value intermediate between said divided voltage and said comparator circuit output;
wherein said comparator output is a first voltage level when said comparison input is greater than a lower value of said reference voltage and is a second voltage level when said comparison input is less than a higher value of said reference voltage.

* * * * *

UNITED STATES PATENT AND TRADEMARK OFFICE
CERTIFICATE OF CORRECTION

PATENT NO. : 4,754,477
DATED : 06/28/88
INVENTOR(S) : Tamaka et al.

It is certified that error appears in the above-identified patent and that said Letters Patent is hereby corrected as shown below:

| COLUMN | LINE | DESCRIPTION |
|--------|------|-------------|
| 03 | 10 | delete "windin" insert --winding-- |
| 12 | 45 | delete "comparato" insert --comparator-- |

Signed and Sealed this

Tenth Day of January, 1989

Attest:

DONALD J. QUIGG

Attesting Officer

Commissioner of Patents and Trademarks